Dec. 4, 1962   J. D. HANCOCK   3,066,841
WELDING GUN FOR THERMOPLASTIC MATERIALS
Filed April 6, 1959
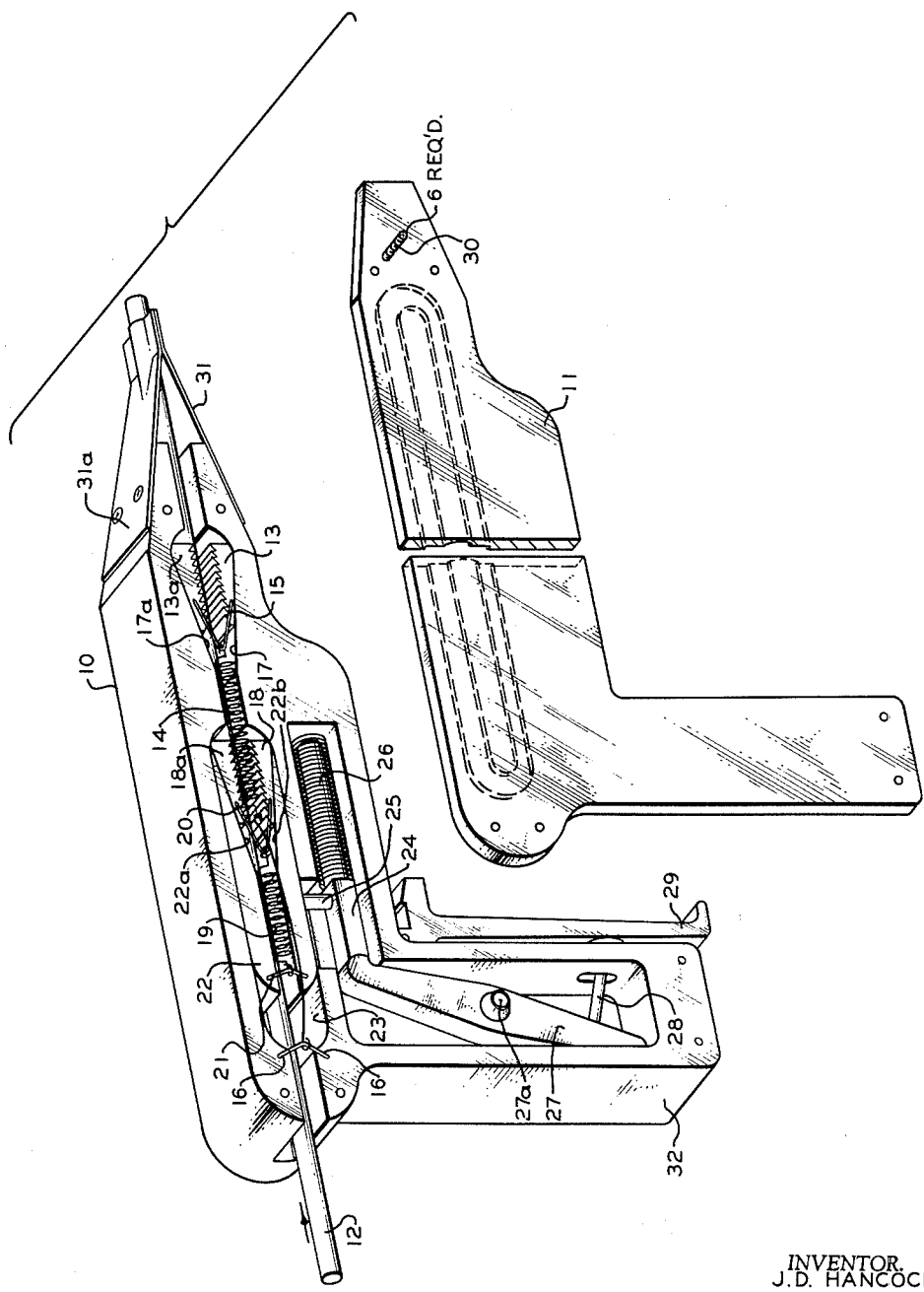
INVENTOR.
J.D. HANCOCK
BY Hudson and Young
ATTORNEYS

United States Patent Office 3,066,841
Patented Dec. 4, 1962

3,066,841
WELDING GUN FOR THERMOPLASTIC MATERIALS
John D. Hancock, Bartlesville, Okla., assignor to Phillips Petroleum Company, a corporation of Delaware
Filed Apr. 6, 1959, Ser. No. 804,289
2 Claims. (Cl. 226—128)

This invention relates to the welding of thermoplastic materials and to a device for feeding the thermoplastic to the area being welded. In one aspect the invention relates to a mechanism for feeding a welding rod of thermoplastic material of any geometric cross section to the workpiece. In another aspect the invention relates to a novel method for feeding a thermoplastic welding rod to the work area whereby superior results are obtained.

In the welding of thermoplastic materials, for example solid polyethylene, a welding rod of the thermoplastic material is usually fed to the workpiece and heat is applied thereto so as to soften the polyethylene and cause a junction or weld between the welding rod and the materials to be welded. The welding of thermoplastic materials as just above described is usually accomplished by feeding the welding rod to the workpiece by hand; however, this has proved unsatisfactory and at times extremely difficult. The rod often gets slippery from perspiration and oils from the skin resulting from the relatively high temperatures required to effect the weld.

It is an object of this invention to provide a device for feeding a thermoplastic welding rod to the workpiece. A further object is the provision of a welding gun for thermoplastic materials which is simple in design and operation and positive in action. It is a further object of this invention to provide an improved method for welding thermoplastic materials by providing a means for advancing the welding rod to the area being welded. Still another object is the provision of a welding gun for thermoplastic materials that will accommodate a welding rod of any geometric cross section. Other and further objects and advantages will be apparent to one skilled in the art upon study of this disclosure including the detailed description of the invention and the accompanying drawing wherein an isometric view of the welding gun and its associated elements are illustrated.

Referring now to the drawing, the gun is shown with body 10 and body plate cover 11 separated to show the mechanism within the body 10. The thermoplastic welding rod 12 advances through the serrated facings of wedges 13 and 13a and is maintained in the advanced position by the tension of spring 14 which is anchored to wedges 13 and 13a by anchor pin 15 and to the body 10 by anchor pin 16 so as to urge the wedges along the inclined planes 17 and 17a. The welding rod 12 is caused to advance by the action of wedges 18 and 18a which are urged into contact with the welding rod 12 by means of the tension of spring 19, anchored to wedges 18 and 18a by means of anchor pin 20, secured to wedges 18 and 18a and anchored by means of anchor pin 21, to the feeder wedge housing 22. Feeder wedge housing 22 travels in recess 23 of body 10 in response to movement of wedge housing actuator 24 which is operatively connected to the wedge housing 22 by dowel pin 25. Wedge housing actuator 24 is moved forward against the compression of spring 26 by means of actuator arm 27 which is operatively connected, by means of dowel pin 28, to trigger arm 29 (shown in compressed position).

Body cover plate 11 is secured to body 10 by means of screws, one of which is indicated as 30.

Spring guides 31 and 31a serve to steady the welding rod at a point near the workpiece.

Actuator arm 27 rotates about a fulcrum 27a which can be a dowel pin secured to the body 10.

The moving parts of the welding gun, with the exception of the trigger 29, contained in appropriate recesses in body 10 are maintained in position by the cover plate 11 so that the working parts are contained within the body of the gun.

The front or forward pair of feeder wedges 13 and 13a are free floating except for the tension of spring 14 so that these wedges, or slips, allow forward movement of the welding rod 12 but rearward movement of rod 12 is prevented by the serrations on the faces of the wedges 13 and 13a bearing against the rod as the wedges are forced toward each other by the inclined surfaces 17 and 17a when a rearward pressure is applied to rod 12. The holding pressure is thus applied to the rod by a relatively large surface so that the rod is held firm with substantially no deformation of the rod or rod surface.

The rear pair of feeder wedges, or slips, 18 and 18a are free floating within the feeder wedge housing 22 except for the tension spring 19 which urges the wedges along the inclined surfaces 22a and 22b of the housing 22 so as to maintain the serrated faces of wedges 18 and 18a in contact with rod 12. As the feeder wedge housing is advanced toward the front of the recess 23 in body 10, the wedges 18 and 18a are forced into engagement with rod 12 by the action of inclined surfaces 22a and 22b and rod 12 is advanced toward the front of the device. When the feeder wedge housing 22 returns to the rear end of recess 23 the spring 19 causes wedges 18 and 18a to follow housing 22 to maintain contact with rod 12 and inclined surfaces 22a and 22b. Wedges 13 and 13a engage rod 12 and maintain its position when wedge housing 22 and wedges 18 and 18a return to their normal position at the rear end of recess 23.

Feeder wedge housing 22 is operatively connected to housing actuator 24 by means of dowel pin 25. Housing 22 is yieldingly maintained in its normal position at the rear end of recess 23 by spring 26 acting against housing actuator 24. An extension of housing actuator 24 acts as a spring guide for spring 26.

Feeder wedge housing 22 is caused to advance in recess 23 by pressure applied to trigger 29, forcing it toward handle 32, so as to rotate actuator arm 27 about the pivot point 27a.

The elements of the gun are fabricated, preferably, from metal and can be molded or machined as desired. The serrations on the wedges 13, 13a, 18 and 18a are made of hardened metal such as tempered steel so as to resist wear and present a firm gripping surface for contact with the welding rod. These serrated faces are sloped in a forward direction and provide a relatively large area for contact with the welding rod, which can be of any geometric design. The gun can be made in various sizes to accommodate different sizes of welding rods.

The welding gun of this invention has been employed in a wide variety of uses including the feeding of plastic strips as well as plastic welding rods of various geometric cross sections and has proved superior to other device in savings in time and in providing trouble-free operation.

Reasonable variations and modifications are possible within the scope of the disclosure of the present invention without departing from the spirit and scope of the invention.

That which is claimed is:

1. Apparatus for feeding thermoplastic welding rod to a workpiece comprising a housing body having a passageway extending therethrough from the rear end to the front end; a first enlarged portion of said passageway adjacent the rear end of said body; a second enlarged portion of said passageway adjacent the front of said body having surfaces which diverge toward the front of said body; carriage means, the front end of which comprises diverging surfaces, positioned in said passageway and yieldingly maintained at the rear end of said first enlarged portion; a trigger means; an activator arm operatively connected to said carriage and to said trigger to propel said carriage forward in said first enlarged portion when the trigger is depressed; a first pair of wedges having sloping serrated adjacent faces with the serrations sloping toward the front, yieldingly maintained in said carriage so that the inclined plane surfaces of the wedges coincide with the diverging surfaces of said carriage so as to engage and propel the welding rod in said passageway when said carriage is propelled forward; a second pair of wedges having sloping, serrated adjacent faces, with the serrations sloping toward the front, yieldingly maintained in said second enlarged portion so that the inclined surfaces of the wedges coincide with the diverging surfaces of said enlarged portion to engage said welding rod and prevent rearward movement of same; and a pair of clamping spring members projecting forward from the front of said body to grip and steady said welding rod.

2. Apparatus for feeding thermoplastic welding rod to a workpiece comprising a housing body having a passageway extending therethrough from the rear end to the front end, the front portion of said passageway having surfaces which diverge toward the front of said body; carriage means, the front end of which comprises diverging surfaces, positioned in said passageway and yieldingly maintained at the rear end portion of said passageway; a trigger means; an activator arm operatively connected to said carriage and to said trigger to propel said carriage forward in said passageway when the trigger is depressed; a first pair of wedges having sloping serrated adjacent faces with the serrations sloping toward the front, yieldingly maintained in said carriage so that the inclined plane surfaces of the wedges coincide with the diverging surfaces of said carriage so as to engage and propel the welding rod in said passageway when said carriage is propelled forward; a second pair of wedges having sloping, serrated adjacent faces, with the serrations sloping toward the front, yieldingly maintained in the front portion of said passageway so that the inclined surfaces of the wedges coincide with the diverging surfaces of said passageway to engage said welding rod and prevent rearward movement of same; and a pair of clamping spring members projecting forward from the front of said body to grip and steady said welding rod.

References Cited in the file of this patent

UNITED STATES PATENTS

| | | |
|---|---|---|
| 1,114,943 | Valois | Oct. 27, 1914 |
| 2,593,715 | Adler et al. | Apr. 22, 1952 |
| 2,628,585 | Cowles | Feb. 17, 1953 |
| 2,711,818 | Ruttkay | June 28, 1955 |
| 2,728,447 | Ware | Dec. 27, 1955 |